(12) United States Patent
Kanyua

(10) Patent No.: US 10,151,295 B2
(45) Date of Patent: Dec. 11, 2018

(54) TIDAL WAVE POWERED DEVICE AND A METHOD FOR PRODUCING POTENTIAL ENERGY

(71) Applicant: Maina Kanyua, Nairobi (KE)

(72) Inventor: Maina Kanyua, Nairobi (KE)

( * ) Notice: Subject to any disclaimer, the term of this patent is extended or adjusted under 35 U.S.C. 154(b) by 161 days.

(21) Appl. No.: 15/503,394

(22) PCT Filed: Dec. 8, 2014

(86) PCT No.: PCT/KE2014/000042
§ 371 (c)(1),
(2) Date: Feb. 12, 2017

(87) PCT Pub. No.: WO2016/024643
PCT Pub. Date: Feb. 18, 2016

(65) Prior Publication Data
US 2017/0241399 A1 Aug. 24, 2017

(30) Foreign Application Priority Data
Aug. 12, 2014 (KE) .............................. 2014/002123

(51) Int. Cl.
*F03B 13/26* (2006.01)
*F03B 13/06* (2006.01)

(52) U.S. Cl.
CPC ............ *F03B 13/262* (2013.01); *F03B 13/06* (2013.01); *F05B 2260/42* (2013.01); *F05B 2270/18* (2013.01); *Y02E 10/38* (2013.01); *Y02E 60/17* (2013.01)

(58) Field of Classification Search
CPC ......... Y02E 60/17; Y02E 10/28; Y02E 10/38; F03B 13/06; F03B 13/262; F03B 13/26; F03B 13/266; F05B 2260/42; F05B 2270/18
See application file for complete search history.

(56) References Cited

U.S. PATENT DOCUMENTS

| | | | | | |
|---|---|---|---|---|---|
| 1,523,031 | A | * | 1/1925 | Mitchell, Jr. ......... | F03B 13/262 405/76 |
| 3,515,889 | A | * | 6/1970 | Kammerer ............ | F03B 13/187 290/53 |

(Continued)

*Primary Examiner* — Mark Laurenzi
*Assistant Examiner* — Xiaoting Hu
(74) *Attorney, Agent, or Firm* — Naomi S. Rosenman-Helfand

(57) ABSTRACT

The invention relates to a tidal wave powered device and a method thereof for producing potential energy from the movement of tidal waves in a water mass, the device comprising a cylinder (18) anchored to the bed (22) of the water mass with a piston (16) located in the cylinder to define a pumping chamber (25) therein. A storage tank (23) is located at an elevated height for storage of water delivered from the cylinder pumping chamber (25). A docking unit (30) anchored to the bed of the water mass is connected to a floater (10) such that when the floater (10) attains an optimal height, the docking unit (30) is locked in to hold the floater (10) in an elevated position. The docking unit (30) is opened to release the floater (10) from the elevated position so that the weight of the floater pushes the piston (16) downwards to deliver water from the pumping chamber (25) of the cylinder (18) into the storage tank (23).

17 Claims, 4 Drawing Sheets

(56) References Cited

U.S. PATENT DOCUMENTS

| | | | | |
|---|---|---|---|---|
| 4,185,464 A * | 1/1980 | Rainey | ............... | F03B 13/262 417/333 |
| 4,208,878 A * | 6/1980 | Rainey | ............... | F03B 13/262 290/53 |
| 4,544,849 A * | 10/1985 | Choi | ............... | F03B 13/262 290/42 |
| 6,800,954 B1 * | 10/2004 | Meano | ............... | F03B 13/1895 290/42 |
| 7,331,174 B2 * | 2/2008 | Welch, Jr. | ............... | E02B 9/08 290/53 |
| 7,827,788 B1 * | 11/2010 | Lomerson, Sr. | ............... | F03B 13/1815 290/42 |
| 8,093,743 B2 * | 1/2012 | Bozano | ............... | F03B 13/145 290/53 |
| 2009/0121486 A1 * | 5/2009 | Ganley | ............... | F03B 13/262 290/53 |
| 2013/0134714 A1 * | 5/2013 | Daqian | ............... | F03B 13/262 290/53 |

* cited by examiner

TIDAL WAVE POWERED DEVICE AND A METHOD FOR PRODUCING POTENTIAL ENERGY

TECHNICAL FIELD

The invention relates to a tidal wave powered device and a method for producing potential energy from the ascending and descending movement of tidal waves in a water mass.

BACKGROUND

Tidal powered devices are well known in the art. Examples include EP 0496146 A1, which discloses a wave-power apparatus for installation in a body of water for converting wave energy into hydrogen gas. EP1197658A1 discloses a pumping system with collapsible arms actuated by marine waves to obtain a high-pressure water flow. WO2011/141691 discloses a tidal or wave energy harnessing device comprising a float connected to a pump, the pump having a piston chamber and a piston wherein, in use, the piston chamber is substantially submerged in the body of water and the piston is anchored to a floor supporting said body of water such that movement of the piston head relative to the piston chamber results from movement of the piston chamber as a result of tidal or wave motion of said body of water.

The present invention aims to provide an alternative tidal wave pumping device of simplified construction.

SUMMARY OF THE INVENTION

The invention discloses a tidal wave powered device and a method of producing potential energy. The device is used to pump water to a storage tank for various uses. The device of the present invention allows tidal waves to be used as a source of renewable energy by producing potential energy that can be used for example to generate electricity, for irrigation and other purposes.

According to a first aspect of the present invention, there is provided a tidal wave powered device for use in a water mass to pump water, the device comprising a cylinder anchored to the bed of the water mass, the cylinder having water inlet and outlet ports; a piston located in the cylinder to define a pumping chamber within the cylinder; a storage tank located at an elevated height for storage of water delivered from the cylinder pumping chamber; a delivery pipe connected between the cylinder and the storage tank to deliver water from the cylinder pumping chamber into the storage tank; a floater capable of floating at the surface of the water mass, the floater having an intake manifold and a chamber for receiving water therein through the intake manifold, the floater being configured such that during the upward movement of tidal waves the weight of the floater is progressively increased by opening the intake manifold to allow water to flood into the floater chamber as the floater rises up in the water mass; a connecting rod connecting the floater to the piston and a docking unit anchored to the bed of the water mass, the docking unit being provided with docking means for telescopically connecting the docking unit to the floater such that the docking means is propelled upwards by the floater to a position where the floater attains an optimal height.

In a second aspect if the invention there is disclosed a method using the device of the present invention to pump water to produce potential energy. The method of generating potential energy using the device includes positioning the device in a water mass. At the initial position of the device at low tide, the intake manifold and the drainage outlet of the floater are closed such that the floater chamber is empty and the piston is at the lowest depth in the cylinder. Preferably, the piston sliding fits within the cylinder.

As the tidal waves start to rise, the floater rises with increasing height of the tidal waves until the floater attains highest level. The upward movement of the floater causes the piston to move up inside the cylinder and water is allowed to get inside a pumping chamber of the cylinder as a water inlet is opened. As the floater is propelled upwards by the tidal waves, an intake manifold is opened to allow water to progressively flood the floater chamber for the floater to gain more weight. The weight (mass) of the floater is important as it is utilized to pump water from the pumping chamber.

A gate in the docking unit is also opened to allow water from the water mass to flow into the jack cylinder during the upward movement of the floater and the docking pad. As tidal waves lift the floater up, the docking pad of the docking unit is also propelled upwards by the floater to a position where the floater attains an optimal height. Once the floater attains the optimal height, the gate is closed for the floater to be held in an elevated position by the docking unit.

In order for the device to pump water to the storage tank, the floater is released from the elevated position by the operation of the docking unit. The docking unit gate is opened to release the floater from the elevated position so that the weight of the floater pushes the piston downwards to deliver water from the pumping chamber of the cylinder into the storage tank. In effect once the gate is opened; the floater descends downwards, pushed by its own weight and the weight of the water in the floater chamber. The weight of the floater forces the water in the pumping chamber to be pumped out through the outlet port via the delivery pipe and into the storage tank where the water is stored as potential energy.

Once the water in the pumping chamber has been delivered into the storage tank, the water in the floater is drained off in preparation for the next pumping cycle of the device.

The water stored in the storage tank (23) can be used for various purposes, including for example generation of power or for irrigation purposes.

DETAILED DESCRIPTION

Figure 1:
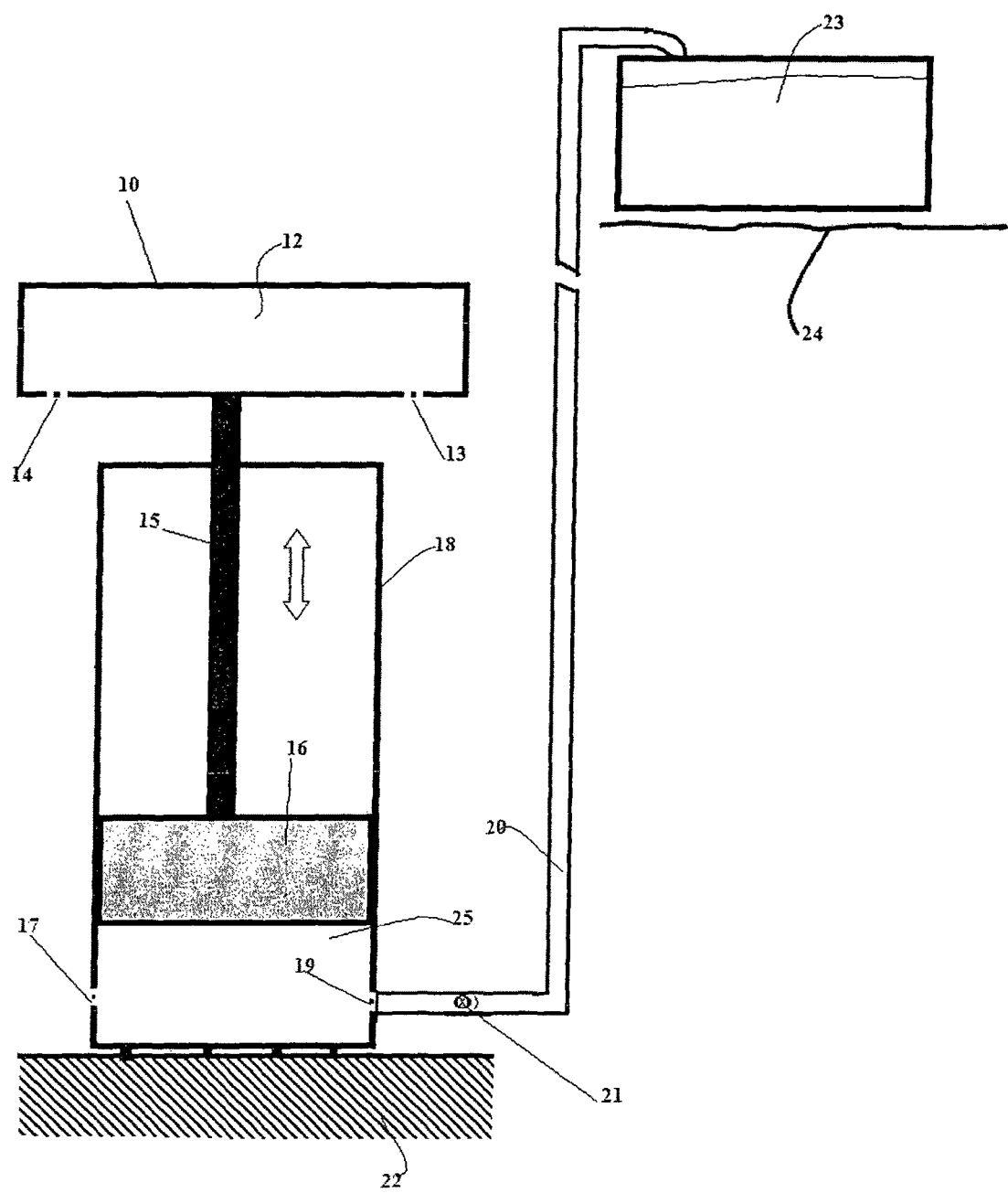
FIG. 1 is a sectional side view of a device according to an embodiment of the present invention in which the device is illustrated substantially in a low tide position.

A tidal wave powered device for producing potential energy from the movement of tidal waves in a water mass is hereby described with reference to the drawings.

The device comprises primarily of a cylinder (18) which is anchored to the bed (22) of a water mass, a floater (10), a piston (16) and a storage tank (23). A water inlet (17) is located on the body of the cylinder, through which water from the water mass is allowed to enter into the cylinder during the upward movement of the piston. The piston (16) is located in the cylinder (18) to define a pumping chamber (25) within the cylinder, of which water is pumped out by the piston into the storage tank (23) located at an elevated height (24) for storage of the water as potential energy. The cylinder (18) is also provided with a water outlet port (19) through which water leaves the cylinder during the pumping cycle of the device.

A delivery pipe (20) is connected between the cylinder and the storage tank (23) to deliver water from the cylinder pumping chamber (25) into the storage tank (23). The piston (16) is connected to the floater (10) through a connecting rod (15). The floater (10) is made in such a way as to float at the surface of the water mass and to be lifted up by the tidal waves. The floater (10) is provided with an intake manifold (13) through which water enters into a chamber (12). The floater (10) is further provided with a drainage outlet (14), which can be opened to drain off water from the floater chamber (12).

The floater (10) is made such that during the upward movement of tidal waves the weight of the floater (10) is progressively increased by opening the intake manifold (13) to allow water to flood into the floater chamber (12) as the floater (10) rises up in the water mass. The connecting rod (15) connecting the floater (10) to the piston (16) is preferably provided with a universal joint (26) for purposes of absorbing shocks of the tidal waves and therefore prevent the connecting rod from breaking due to the weight of the floater (10) and the movement of the tidal waves.

Figure 2:
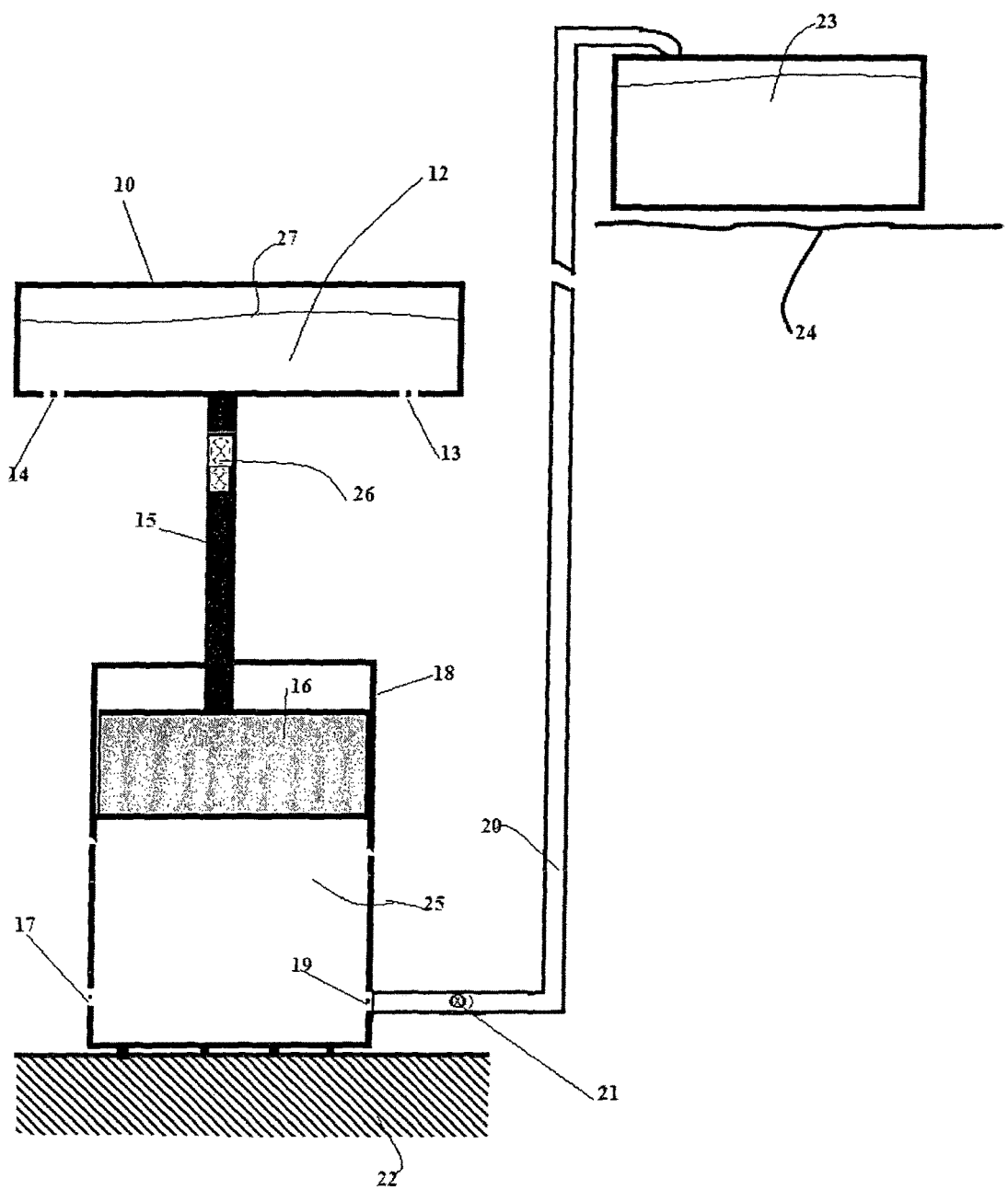
FIG. 2 a sectional view of the device substantially in a high tide position.
Figure 3:
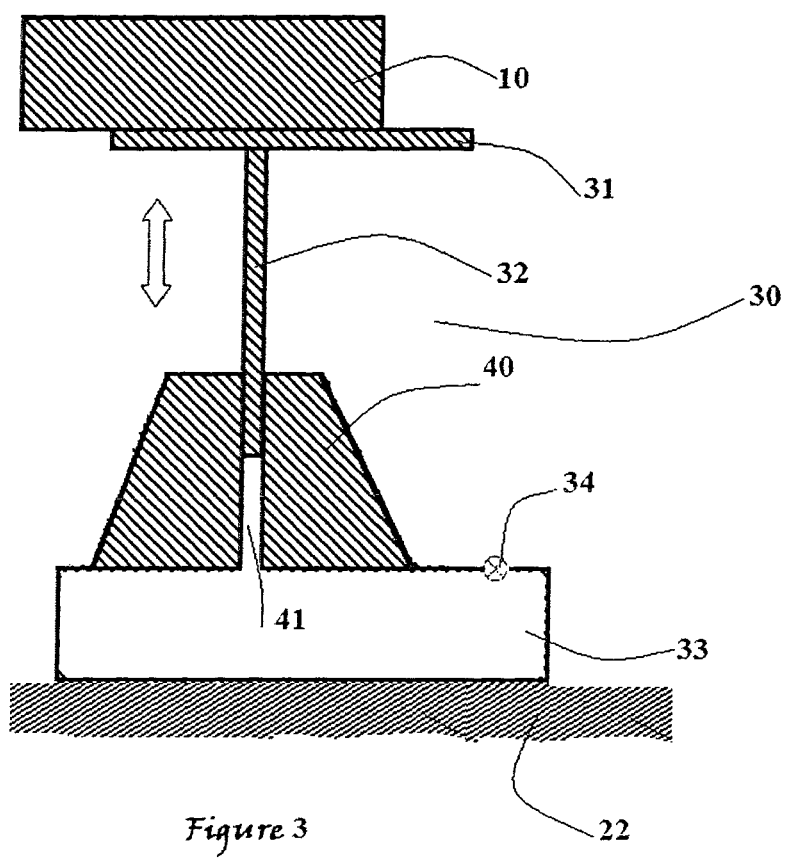
FIG. 3 is a sectional view of a docking unit of the device of the present invention illustrated substantially in a high tide position.

With reference to FIG. 3, the device further comprises a docking unit (30) that is also anchored to the bed (22) of the water mass. The docking unit (30) is provided with docking means for telescopically connecting the docking unit to the floater (10) such that the docking means is propelled upwards by the floater (10) to a position where the floater (10) attains an optimal height (27) as illustrated in FIG. 2. Upon the floater (10) attaining the optimal height, the docking unit (30) is closed to hold the floater (10) in an elevated position.

The docking unit comprises a jack cylinder (33) that is capable of receiving water therein, a docking pad (31), and a bore body (40) that defines a bore (41) therein. Preferably, the bore body (40) is integral with the jack cylinder (33). The jack cylinder is provided with a gate (34) that is configured to allow water to be received into and discharged from the cylinder (33). The docking pad (31) is connected to the floater (10) while a plunger (32) is connected to the docking pad (31) on one end while the other end of the plunger (32) extends within the bore body (40). The configuration of the docking unit (30) allows water to flow between the jack cylinder (33) and the bore (41).

The mode of operation of the device as well as the method of generating potential energy using the device will now be described.

Figure 4:
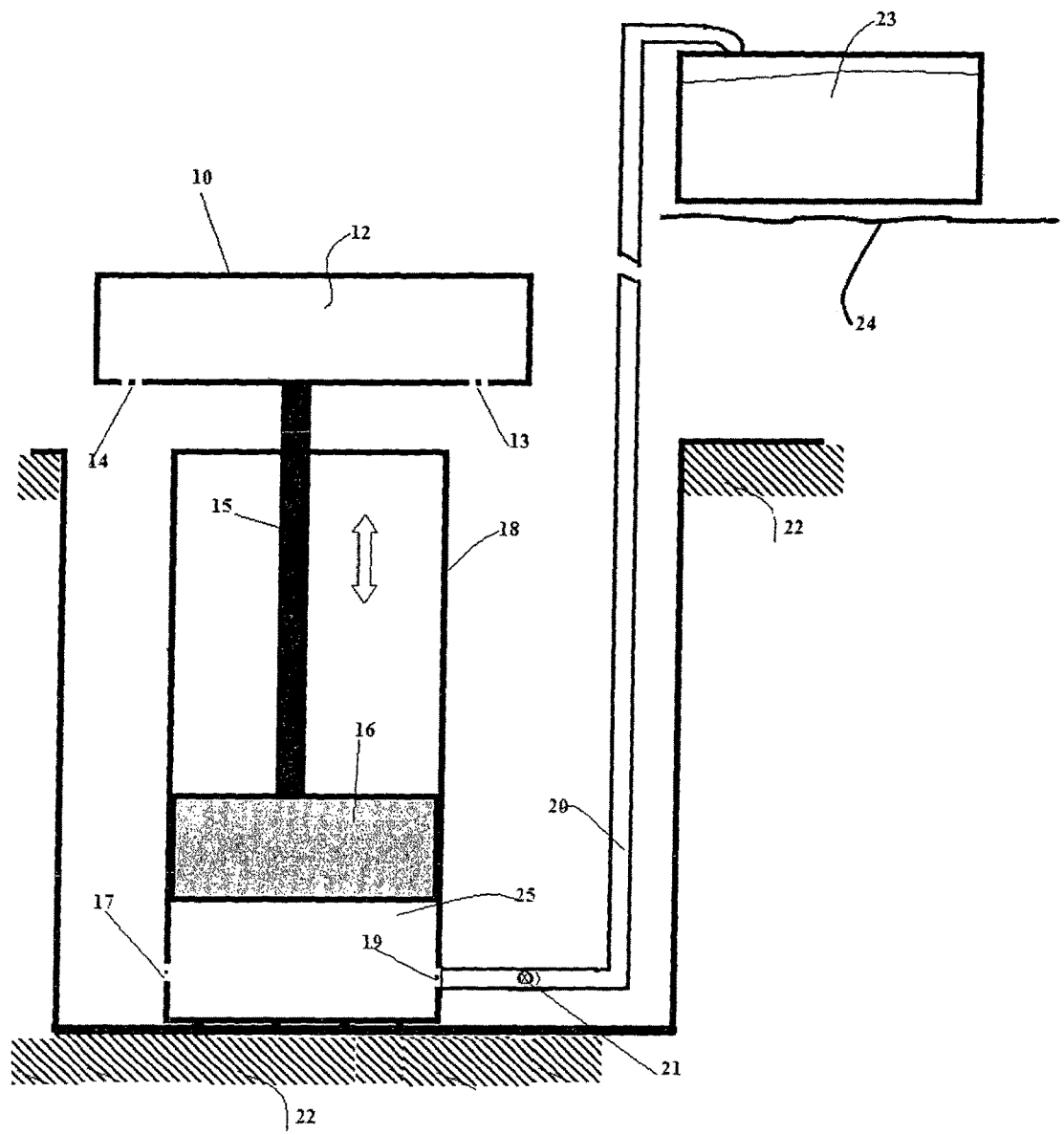
FIG. 4 is a sectional view of another embodiment of the device of the present invention in which the device is anchored below the seabed.

During a low tide the initial position of device in the water mass is substantially as illustrated in either FIG. 1 or FIG. 4, of which in FIG. 1 the device is anchored on the seabed (22) of the water mass while in FIG. 4 the device is anchored below the seabed. The positioning of the device in the water mass is determined based on the depth of the water mass and the average height of tidal waves in the designated water mass location. For example, in places where the tidal waves are not very high the device may then be anchored below the seabed to increase the upward height of the floater. The height of the floater (10) relative to the cylinder (18) determines the volume of the water that will enter the pumping chamber (25) and therefore the volume of water that will be pumped out into the storage tank (23). At the initial position of the device at low tide, the intake manifold (13) and the drainage outlet (14) of the floater are in closed positions such that the floater chamber (12) is empty and the piston (16) is at the lowest depth in the cylinder (18).

As the tidal waves start to rise, seawater lifts the floater (10) and the floater will keep on rising to the highest level of the tide. The upward movement of the floater (10) actuates the connecting rod (15) and the piston to move up inside the cylinder (18). As the piston (16) moves up, water inlet (17) is opened to allow water to enter the pumping chamber (25). The water inlet (19) may be opened mechanically or it may be fitted with a valve that is opened by the suction effect of the upward movement of piston (16). In the meantime, as the floater (10) is propelled upwards by the tidal waves, the intake manifold (13) is opened to allow water to progressively flood the floater chamber (12) and in the process, the floater gains more weight. The weight (mass) of the floater is important as it is used to pump water from the pumping chamber (25).

The gate (34) of the docking unit is also opened and water from the water mass flows into the jack cylinder (33) during the upward movement of the floater (10) and the docking pad (31). As the tidal waves lift the floater (10) up, the docking pad (31) of the docking unit (30) is also propelled upwards by, the floater (10) to a position where the floater (10) attains an optimal height. Once the floater (10) attains the optimal height, the gate (34) is closed and the floater (10) is held in that elevated position by the docking unit (30). Upon closure of the gate (34), the docking unit (30) being anchored to the water mass is made hold the floater (10) in an elevated position even when tidal waves subside. The main purpose of the docking unit is to hold the floater in an elevated position until the tide is low. At this position, the potential energy has been maximized by the weight of the floater and the water in the floater chamber. Accordingly, the weight of the floater can be varied by regulating the amount of water allowed into the floater chamber.

Upon the tides subsiding, the floater (10) is released from the elevated position by the operation of the docking unit. Gate (34) is opened to release the floater from the elevated position such that the weight of the floater (10) pushes the piston (16) downwards to deliver water from the pumping chamber (25) of the cylinder (18) into the storage tank (23). In effect once the gate (34) is opened, the floater (10) descends downwards, pushed by its own weight and the weight of the water in the floater chamber (12). The weight of the floater (10) forces the water in the pumping chamber (25) to be pumped out through the outlet port (19) via the delivery pipe (20) and into the storage tank (23) where the water is stored as potential energy.

During the downward movement of the floater (10) and as the plunger (32) is forced downward by the weight of the floater (10) some of the water inside jack cylinder (33) is discharged through the gate (34). The outlet port (19) of the cylinder is configured to allow water to be pumped out of the pumping chamber (25) into the storage tank (23) during the downward movement of the piston (16). For example, the outlet port (19) may be mechanically opened through a gate valve (21) or the outlet port (19) could be provided with a one-way valve that would be opened by the downward force of the piston (16).

Once the water in the pumping chamber (25) has been delivered into the storage tank (23), the water in the floater (10) is drained off in preparation for the next pumping cycle of the device. The method of draining water out of the floater chamber (12) involves opening the drainage outlet (14) on the floater. Preferably, the water in the floater chamber (10) is drained out at low tide.

Various Modifications may be made without departing from the scope of the invention as defined in the claims. For example whilst the embodiment above describes a piston attached to the connecting rod, it will be appreciated that the piston can be made integral with the connecting rod. While the terms water mass, sea water and sea bed have been used in this example, it will be appreciated that the device can be used in other water masses including lakes, oceans, dams and rivers.

The invention claimed is:

1. A tidal wave powered device, for producing potential energy from the movement of tidal waves in a water mass, the device comprising:
   a cylinder anchored to the bed of the water mass, the cylinder having water inlet and outlet ports;
   a piston located in the cylinder to define a pumping chamber within the cylinder;
   a storage tank located at an elevated height for storage of water delivered from cylinder pumping chamber;
   a delivery pipe connected between the cylinder and the storage tank to deliver water from the cylinder pumping chamber into the storage tank;
   a floater capable of floating at the surface of the water mass, the floater having an intake manifold and a chamber for receiving water therein through the intake manifold, the floater being configured such that during the upward movement of tidal waves the weight of the floater is progressively increased by opening the intake manifold to allow water to flood into the floater chamber as the floater rises up in the water mass;
   a connecting rod connecting the floater to the piston; and
   a docking unit anchored to the bed of the water mass, the docking unit being provided with docking means for telescopically connecting the docking unit to the floater such that the docking means is propelled upwards by the floater to a position where the floater attains an optimal height, the docking unit comprising:
      a jack cylinder capable of receiving water therein, the jack cylinder being provided with a gate that is configured to allow water to be received into and discharged from the jack cylinder;
      a docking pad connected to the floater; and
      a plunger connected to the docking pad on one end while the other end of the plunger extends within a bore body defining a bore therein, the bore body being integral with the jack cylinder such that water flows between the jack cylinder and the bore,
      the docking means comprising the docking pad and the plunger.

2. A device as in claim 1 wherein upon the floater attaining the optimal height the gate of the docking unit is closed to hold the floater in an elevated position.

3. A device as in claim 2 wherein the docking unit is operable to release the floater from the elevated position such that the weight of the floater pushes the piston downwards to deliver water from the pumping chamber of the cylinder into the storage tank.

4. A device as in claim 3 wherein the outlet port of the cylinder is configured to allow water to be pumped out of the pumping chamber into the storage tank during the downward movement of the piston.

5. A device as in claim 1 wherein the floater is provided with a drainage outlet, the drainage outlet being openable to drain off the floater chamber.

6. A device as in claim 5 wherein the floater is drained off at low tide.

7. A device as in claim 1 wherein the water inlet port of the cylinder is configured to allow water to flow into the pumping chamber of the cylinder during the upward movement of the piston.

8. A device as in claim 1 wherein the connecting rod connecting the floater to the piston is provided with a universal joint.

9. A device as in claim 1 wherein water is received in the jack cylinder during the upward movement of the floater and discharged from the jack cylinder during the downward movement of the floater.

10. A device as in claim 1 wherein the gate is configured to move from a closed position to an open position such that in the open position water either flows into the jack cylinder as the floater is lifted up by tidal waves or water is discharged from the jack cylinder during the downward movement of the floater.

11. A device as in claim 10 wherein when the gate is in the closed position the floater is held in an elevated position.

12. A device as in claim 11 wherein the gate of the jack cylinder is moveable from the closed position to the open position to release water in the jack cylinder such that the floater descends from the elevated position and water in the cylinder pumping chamber is delivered into the storage tank.

13. A method of generating potential energy using a tidal wave powered device, the device comprising a cylinder anchored to the bed of a water mass, the cylinder having water inlet and outlet ports, a piston located in the cylinder to define a pumping chamber within the cylinder, a storage tank located at an elevated height, a delivery pipe connected between the cylinder and the storage tank, a floater capable of floating at the surface of the water mass, the floater having an intake manifold and a chamber for receiving water, therein, a connecting rod connecting the floater to the piston, a docking unit anchored to the bed of the water mass, the docking unit being provided with docking means for telescopically connecting the docking unit to the floater, the docking unit comprising: a jack cylinder capable of receiving water therein, the jack cylinder being provided with a gate that is configured to allow water to be received into and discharged from the jack cylinder, a docking pad connected to the floater, and a plunger connected to the docking pad on one end while the other end of the plunger extends within a bore body defining a bore therein, the bore body being integral with the jack cylinder such that water flows between the jack cylinder and the bore, the docking means comprising the docking pad and the plunger, the method comprising the following steps:
   allowing water to flow into the pumping chamber of the cylinder through the water inlet port in response to the upward movement of the piston as the floater is propelled upwards by tidal waves;
   increasing the weight of the floater progressively by allowing water from the water mass to flood into the floater chamber as the floater and the docking means are propelled upward in the water mass by tidal waves;
   closing the gate of the docking unit to hold the floater in an elevated position relative to the water mass upon the floater attaining an optimal height;
   opening the gate of the docking unit to release the floater from the elevated position to allow the weight of the floater to push the piston downwards and to pump the water in the pumping chamber of the cylinder into the storage tank where the water is stored as potential energy.

14. The method of claim 13 wherein the step of allowing water to flood the floater includes opening the intake manifold of the floater.

15. The method of claim 13 further comprising the step of draining water out of the floater chamber to prepare the device for the next cycle.

16. The method of claim 15 wherein the step of draining water out of the floater chamber includes opening a drainage outlet provided on the floater.

17. The method of claim 16 wherein the water in the floater chamber is drained out at low tide.

* * * * *